United States Patent
Schory et al.

(10) Patent No.: US 9,137,204 B2
(45) Date of Patent: Sep. 15, 2015

(54) NETWORK SECURITY SMART LOAD BALANCING

(75) Inventors: Omer Schory, Hod Hasharon (IL); Ofer Raz, Ramat Gan (IL); Oded Gonda, Tel-Aviv (IL)

(73) Assignee: CHECK POINT SOFTWARE TECHNOLOGIES LTD., Tel Aviv (IL)

( * ) Notice: Subject to any disclaimer, the term of this patent is extended or adjusted under 35 U.S.C. 154(b) by 2079 days.

(21) Appl. No.: 11/345,341

(22) Filed: Feb. 2, 2006

(65) Prior Publication Data

US 2007/0180226 A1 Aug. 2, 2007

(51) Int. Cl.
*H04L 29/06* (2006.01)
*H04L 29/12* (2006.01)

(52) U.S. Cl.
CPC ...... *H04L 63/0218* (2013.01); *H04L 29/12481* (2013.01); *H04L 61/2557* (2013.01)

(58) Field of Classification Search
USPC .................................................. 713/150–153
See application file for complete search history.

(56) References Cited

U.S. PATENT DOCUMENTS

| | | | |
|---|---|---|---|
| 6,424,992 B2 | 7/2002 | Devarakonda | |
| 6,880,089 B1 | 4/2005 | Bommareddy et al. | |
| 7,107,609 B2 | 9/2006 | Cheng | |
| 7,274,706 B1 * | 9/2007 | Nguyen et al. | 370/419 |
| 7,280,540 B2 | 10/2007 | Halme | |
| 7,590,736 B2 | 9/2009 | Hydrie | |
| 7,860,975 B2 | 12/2010 | Elving | |
| 2002/0143955 A1 * | 10/2002 | Shimada et al. | 709/227 |
| 2003/0002494 A1 | 1/2003 | Kuukankorpi et al. | |
| 2003/0018914 A1 * | 1/2003 | Cheng et al. | 713/201 |
| 2003/0088664 A1 * | 5/2003 | Hannel et al. | 709/224 |
| 2003/0093691 A1 * | 5/2003 | Simon et al. | 713/201 |
| 2003/0131262 A1 * | 7/2003 | Goddard | 713/201 |
| 2003/0191970 A1 * | 10/2003 | Devine et al. | 713/201 |
| 2004/0022247 A1 * | 2/2004 | Chen et al. | 370/395.5 |
| 2004/0024880 A1 * | 2/2004 | Elving et al. | 709/227 |
| 2004/0172528 A1 * | 9/2004 | Tenereillo | 713/153 |

(Continued)

OTHER PUBLICATIONS

Definition of NAT, Microsoft Computer Dictionary, Fifth Edition, Microsoft Press.*

(Continued)

*Primary Examiner* — David Le
(74) *Attorney, Agent, or Firm* — Mark M. Friedman

(57) ABSTRACT

A system and method for protecting data communications in a system including a load-balancer connected to a cluster of security network components, e.g. firewall node. The load-balancer transfers one or more of the data streams respectively to the security components. The security network components transmit control information to the load-balancer and the control information includes an instruction regarding balancing load of the data streams between said security network components; The load-balancer balances load based on the control information. Preferably, network address translation is performed by the load-balancer based on the control information or network address translation is performed by the security network component and the control information includes information regarding an expected connection based on the network address translation. Preferably, when the data communications includes an encrypted session, an encrypted connection of the encrypted session is identified based on the control information and the balancing of the load maintains stickiness of said encrypted connection.

30 Claims, 4 Drawing Sheets

(56) References Cited

U.S. PATENT DOCUMENTS

| | | | |
|---|---|---|---|
| 2005/0044351 A1* | 2/2005 | Harvey | 713/153 |
| 2005/0183140 A1* | 8/2005 | Goddard | 726/11 |
| 2005/0257256 A1* | 11/2005 | Supnik et al. | 726/11 |

OTHER PUBLICATIONS

Definition of persistence, Microsoft Computer Dictionary, Fifth Edition, Microsoft Press.*

* cited by examiner

SLB protocol

NETWORK SECURITY SMART LOAD BALANCING

FIELD AND BACKGROUND OF THE INVENTION

The present invention relates to security of data networks and specifically to a system and method for providing a high-speed firewall which protects internal networks while processing complex connections.

Firewall techniques involve using a set of rules to compare incoming data packets to a defined security policy. A firewall accepts and denies traffic between two or more network domains. In many cases, there are three domains where the first domain is an internal network such as in a corporate organization. Outside the internal network is a second network domain where both the internal network and the outside world have access, sometimes known as a "demilitarized zone" or DMZ. The third domain is the external network of the outside world.

A firewall regulates the flow of data packets. A packet includes a header and a payload. The header includes header information (i.e. header parameters), which typically includes a source and destination address, and source and destination port numbers, and a protocol. The payload includes data conveyed by the packet from its source to its intended destination. The firewall, which is situated between the source and destination, intercepts the packet. The firewall filters packets based upon header information and a rule previously loaded into the firewall. The rule correlates a pattern in the header of a packet with a prescribed action, either PASS or DROP or other actions like encrypt, perform network address translation (NAT) send a RESET packet, generate logs, and perform content inspection. The filter identifies the rule that applies to the packet based upon the packet's header, and then implements the rule's prescribed action. When a DROP action is performed, the packet is blocked (deleted), and does not reach its intended destination. When a PASS action is performed, the packet is passed on toward its intended destination. The set of rules loaded into a firewall reflect a security policy, which prescribes what type of information is permissible to pass through the firewall, e.g., from which source, to which destination, and for which application.

To ensure sufficient capacity of a firewall, it is common to construct clusters which include typically a number of firewall nodes sharing a common network address, and connections are typically directed to the cluster by means of a cluster network address. Additionally, the nodes typically have node-specific addresses, e.g. MAC addresses. In a cluster, if the firewall nodes have a common cluster network address, all the firewall nodes read all data packets arriving at the cluster. Consequently, there has to be an arrangement for distinguishing which data packets belong to which node. Each node should process only those packets that are assigned to it and not receive or receive but ignore other data packets.

Connections directed to a cluster of network elements are directed to different nodes of the cluster on the basis of predefined distribution criteria. Frequently, distributing is done so that each firewall node filters all arriving data packets and decides on the basis of the header field(s) of the packet whether that particular node needs to process that particular packet. Frequently, specific sets of hash values are allocated to the nodes and a hash value for a data packet is calculated using a predetermined hash function and certain header fields of the data packet. Typically the header fields that are used for calculating hash values for TCP/IP (Transfer Control Protocol/Internet Protocol) or for UDP/IP (User Datagram Protocol/Internet Protocol) are source address, source port, destination address and destination port. When a data packet directed to the cluster network address arrives at the cluster, a hash value is calculated on the basis of some header fields of the data packet, and the resulting hash value defines which node processes the data packet. Typically, all nodes filter all arriving data packets by calculating hash values for them, and then decide on the basis of the hash values regarding which packets which belong to each node. Methods other than calculating a hash from the header connection information may be used for distributing the data packets.

Several prior art techniques are used to determine distribution of packets among the firewall nodes. Often, a return to sender (RTS) technique is used in which for each connection the load balancer learns the MAC address of the firewall node so that replies from servers are directed to the correct firewall. Sometimes the load between the firewall nodes is balanced statically without any dynamic adjustment of load between the firewall nodes and/or a new connection is assigned according to a "round robin" technique distributing each new connection to the next firewall node in a queue without regard to the actual availability of the node. A simple query, such as a "ping" may be used and the time to respond to the "ping" is measured to roughly assess the availability of the firewall node.

According to U.S. Pat. No. 6,880,089, a firewall clustering system connects two or more firewalls between an internal network and an external network. Firewalls maintain client-server state information. Flow controllers are connected to the firewalls and placed on both the internal "trusted" side and the external "untrusted" side of the firewalls. Flow controllers are placed on both sides of the firewalls to ensure that traffic for a given client-server connection flows through the same firewall in both inbound and outbound directions. The firewalls perform filtering operations and/or network address translation (NAT) services.

According to a method disclosed in US patent application publication 20030002494, node-specific lists of connections are maintained which specify for which connections each node of a firewall is responsible. A data packet, which initiates opening of a new connection, is processed in a node determined by a distribution decision according to predetermined distribution criteria. The first data packets are thus distributed to the cluster nodes. A data packet, which relates to an opened packet data connection, is processed in that node in whose connection list the opened packet data connection is specified. Changing the distribution criteria is required when load is not in balance between the nodes, or when a new node is added or removed to/from the cluster.

The prior art addresses load balancing between firewall nodes for "simple connections". An important requirement from a load balancing device is to maintain connection stickiness, so that all packets belonging to the same connection will be forwarded to same firewall. Standard load balancers available on the market today can provide connection stickiness for simple connection types. However, for complex connections, such as when control and data are on different connections, e.g. FTP or voice over IP connections when NAT is applied, the NAT information is inserted into the payload, the prior art method load balancing systems and methods are not appropriate, and different firewalls may be processing different packets of the same complex connection.

There is thus a need for, and it would be highly advantageous to have a system and method in which one or more firewalls of a firewall cluster manages the load balancer specifically by inspecting the content, i.e. payload, of packets of a complex connection, and directs a switch regarding expected connections related to the complex connection.

SUMMARY OF THE INVENTION

The term "blade and the term "node" are used herein interchangeably. The terms "firewall" and "firewall node" are used herein interchangeably. The firewall is a computer running firewall software, hardware and/or firmware. An example of firewall software is Check Point Firewall-1/VPN-1. (Check Point Software Technologies Ltd., 3A Jabotinsky St., Ramat Gan, ISRAEL). The term "firewall cluster" is used to denote a cluster of firewalls. The term "security network component" as used herein is a network component, such as a firewall or server, which performs a security function such as inspection, NAT, and encryption. The term "switch" denotes a load balancing switching device. The term "switch" and the term "load balancer" are used herein interchangeably. The term "firewall identifier" is a unique number identifying the specific firewall. A firewall is identified by the physical port number it is connected to and/or a MAC address. The firewall identifier may be related to or corresponding to, such as with a look up table, to MAC address, or switch port number. The term "stickiness" or "persistence" as used herein is used to denote the property that all packets of the same session or related connections are processed by the same security network component. The terms "complex connection" and "session" are used herein interchangeably.

According to the present invention there is provided a method for protecting data communications in a system including a load-balancer connected to a cluster of security network components, e.g. firewall node. The load-balancer transfers one or more of the data streams respectively to the security components. The security network components transmit control information to the load-balancer and the control information includes an instruction regarding balancing load of the data streams between said security network components; The load-balancer balances load based on the control information. Preferably, network address translation is performed by the load-balancer based on the control information or network address translation is performed by the security network component and the control information includes information regarding an expected connection based on the network address translation. Preferably, when the data communications includes an encrypted session, an encrypted connection of the encrypted session is identified based on the control information and the balancing of the load maintains stickiness of said encrypted connection. Preferably, the control information specifies one of the security network components to receive a new connection. Preferably, a packet is received by the security network component of the cluster through the load-balancer, and the packet is of a connection of a communications session; the security network component reads at least one datum from the packet and the control information is based on the datum and specifies an expected connection. Preferably, the datum is in a payload of the packet. Preferably, encryption is performed by the security network component, and the control information includes information regarding an expected connection based on the encryption. Preferably, the communications session is encrypted by the security network component and the load-balancer identifies one or more of the data streams of the encrypted communications session based on the control information. Preferably, the expected connection includes an expected packet of the session. Preferably, upon receiving an expected packet of the expected connection, the expected packet is forwarded based on the control information and preferably, from the load balancer to selectively either the security network component or to a network connected to the load balancer and bypassing said security network component. Preferably, the control information specifies an expected client-to-server connection and an expected server-to-client connection, and a condition is fulfilled: (i) a parameter of the client-to-server connection differs from a destination parameter of the server-to-client connection; and or (ii) a destination parameter of the client-to-server connection differs from a source parameter of the server-to-client connection. Preferably, the packet is of a multicast connection and the control information directs the load-balancer to direct all multicast packets of the multicast connection to one of the network components. Preferably, when the load-balancer reaches a maximum capacity, one or more connections are dropped and the network component is informed of the dropped connections.

According to the present invention there is provided a system for protecting data communications. The system includes a cluster of network components, and a load-balancer which connects the network components. Data streams are transferred respectively to the security network components and a load balancer receives a command from one or more security network components, the command including an instruction regarding balancing load of the data streams between the security network components. Preferably, network address translation is performed by either one of the security network components or the load-balancer. Preferably, the command includes control information based on at least one datum received by one or more of the security network component. Preferably, the command specifies an expected connection, and the expected connection includes an expected packet. Preferably, the security network components is an independent gateway connected through a network interface, a blade connected to the load balancer and/or two or more of the security components are implemented using independent processors on the same circuit board.

According to the present invention there is provided a system for protecting data communications. The data communications includes sessions wherein connection information is included as arguments of control commands of the sessions. The system includes a cluster of network components; and a switch which connects the network components to at least one network; and a protocol which configures the network components and the switch so that the network components read the connection information; and commands from the network components to the switch allow maintaining connection stickiness in the sessions, when connection stickiness guarantees that all packets of each of the sessions are processed by a single network component. Preferably, the protocol includes a new-connection command, wherein the network component reads the connection information and based on the connection information, transfers expected connection information to the switch. Preferably, the protocol includes a register multicast command wherein all packets of related multicast connections are processed by a single network component.

BRIEF DESCRIPTION OF THE DRAWINGS

The invention is herein described, by way of example only, with reference to the accompanying drawings, wherein.

DESCRIPTION OF THE PREFERRED EMBODIMENTS

Figure 1:
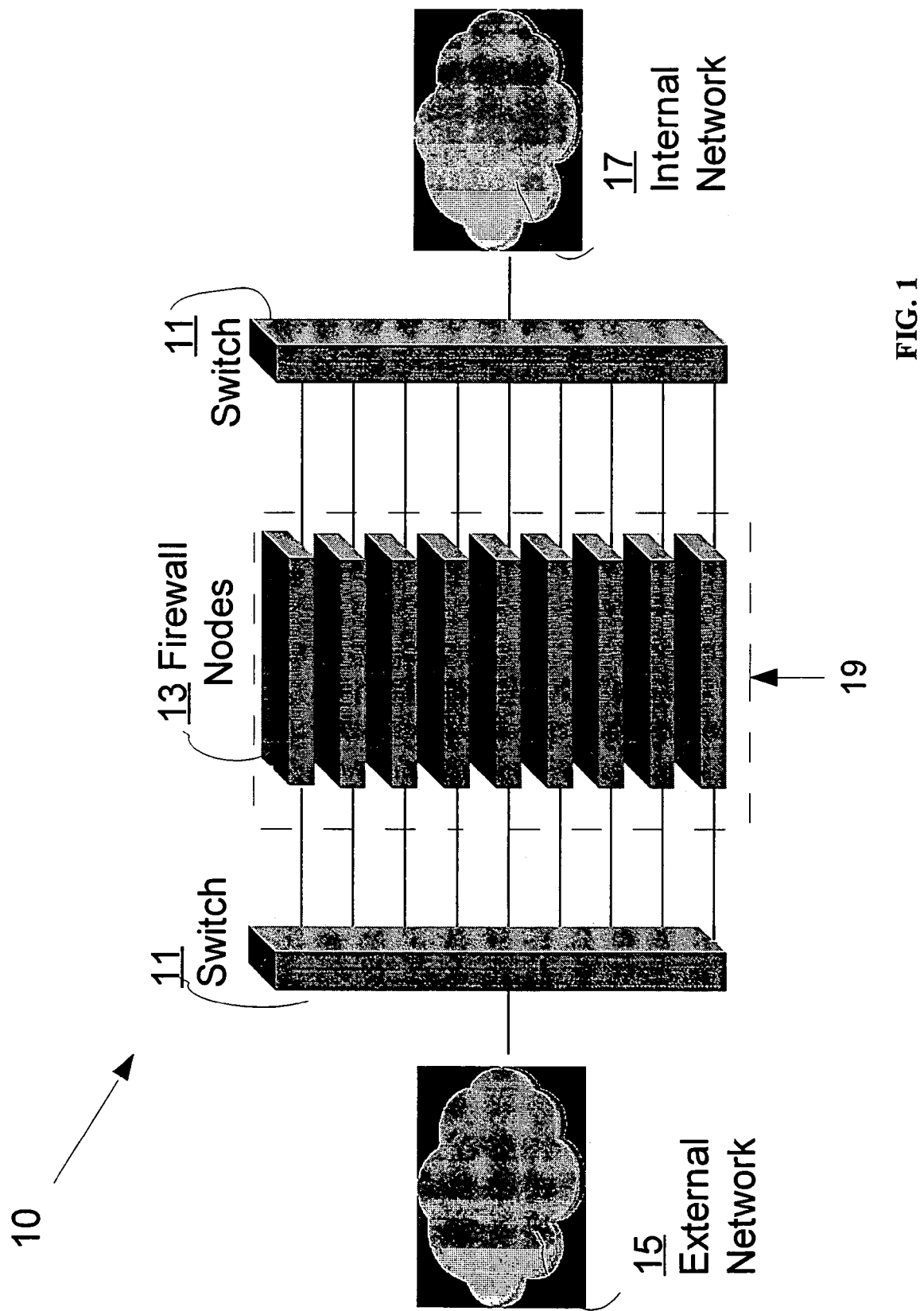
FIG. 1 is a drawing of a cluster of firewall nodes at a gateway between two networks, a system which is used for the method of the present invention

The present invention is of a system and method for smart load balancing of a cluster of firewall nodes. Typically it is advantageous that in a cluster of firewall nodes, a single firewall node processes all the packets of a connection. For simple connections, it is typically sufficient to read header information of packets to insure that the same firewall node handles all the packets of the simple connection. However, for complex connections or sessions, often control information specifying upcoming connections is transferred as arguments of control commands, i.e., in the payloads of the packets of the control command. The present invention utilizes the control information to maintain connection stickiness by transferring information using a special protocol to a switch connecting the firewall nodes. The switch subsequently transfers new connections to the appropriate firewall node.

The principles and operation of a system and method of smart load balancing (SLB), according to the present invention, may be better understood with reference to the drawings and the accompanying description.

It should be noted, that although the discussion herein relates to load balancing between firewall nodes in a cluster, the present invention may, by non-limiting example, alternatively be configured as well using load balancing in a cluster of other network components such as in a cluster of servers. A difference between load balancing in a firewall cluster and load balancing in a gateway with a cluster of servers is that the server is typically identified by a unique IP address while in firewall nodes a connection, e.g. packet, does not include an identifier specifying which firewall node will handle the connection.

Before explaining embodiments of the invention in detail, it is to be understood that the invention is not limited in its application to the details of design and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

By way of introduction, principal intentions of the present invention are to: provide high speed (~10 Gbs) load balancing through a cluster of firewall nodes and maintain: "stickiness", i.e. to process all packets of the same connection using the same firewall node, even for control and data packets of the same complex connection.

Referring now to the drawings, FIG. 1 illustrates a system 10 used according to an embodiment of the present invention. System 10 or SLB device 10 is a symmetric configuration of two switches 11 which switch data traffic at a gateway between an internal network 17 and an external network 15. Switches 11 are configured to decide which firewall node 13 is used of firewall cluster 19 to process data and control packets traveling between internal network 17 and external network 15. Alternatively, in a different configuration a single switch 11 may be used with firewall cluster 19. Both switches 11 and firewall nodes 13 are computers or computing machines each including a processor and memory and appropriate interfaces (not shown). Different embodiments of the present invention include a number of hardware configurations including multiple processors on a single circuit board, or alternatively multiple boards (or blades) each including a single processor or alternatively different nodes connected via a network. A basic requirement from switch 11 is to perform load-balancing between the firewalls 13 with stickiness. Switch 11 may employ known algorithms for load balancing e.g. Round-Robin, Server-Load, Hash.

In another embodiment of the present invention a single switch 11 is connected respectively through different ports to external network, e.g. Internet, 15 and to LAN 17. Firewall 13 needs to send control commands to switch 11 including a description of the connections both on the Internet side and on the LAN side.

Figure 2:
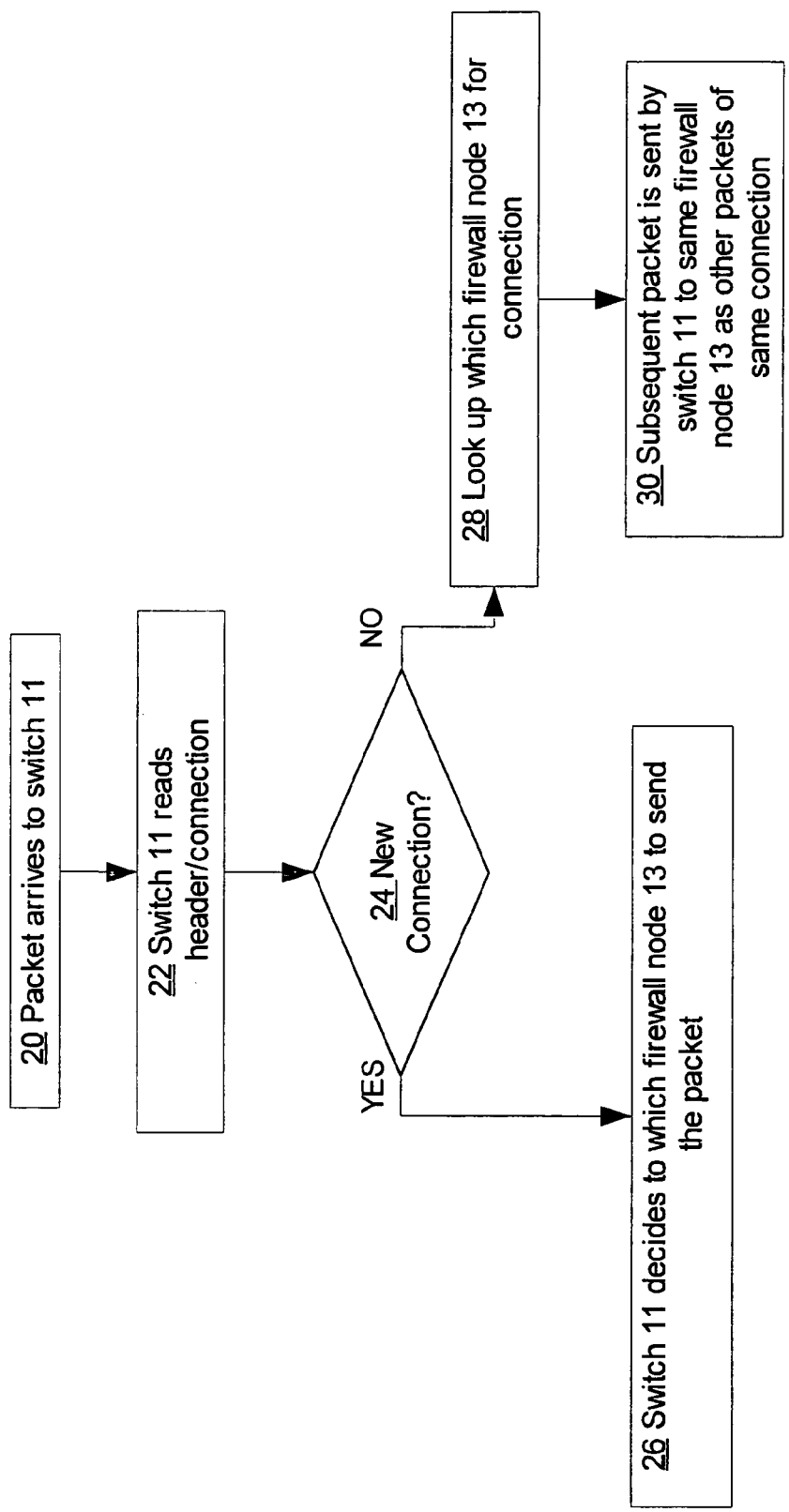
FIG. 2 is a prior art flow drawing of the prior art for processing simple connections.

Reference is now made also to FIG. 2 which shows a prior art method for balancing load of simple connections through system 10. A packet of a simple connection arrives (step 20) at switch 11. Typically, switch 11 reads (step 22) the header of the packet and checks to determine if the received packet is of an existing connection or a new connection (decision block 24). If the received packet is a first packet of a new connection then switch 11 decides (step 26) to which firewall node 13 to send the received packet based on a previously defined rule stored in memory. Otherwise, if the received packet is not a first packet but a packet of an existing connection, then switch 11 look up (step 28) the connection and switches (step 30) the packet to the correct firewall node 13, typically with the same firewall node 13 processing all the packets of the same connection.

Figure 3:
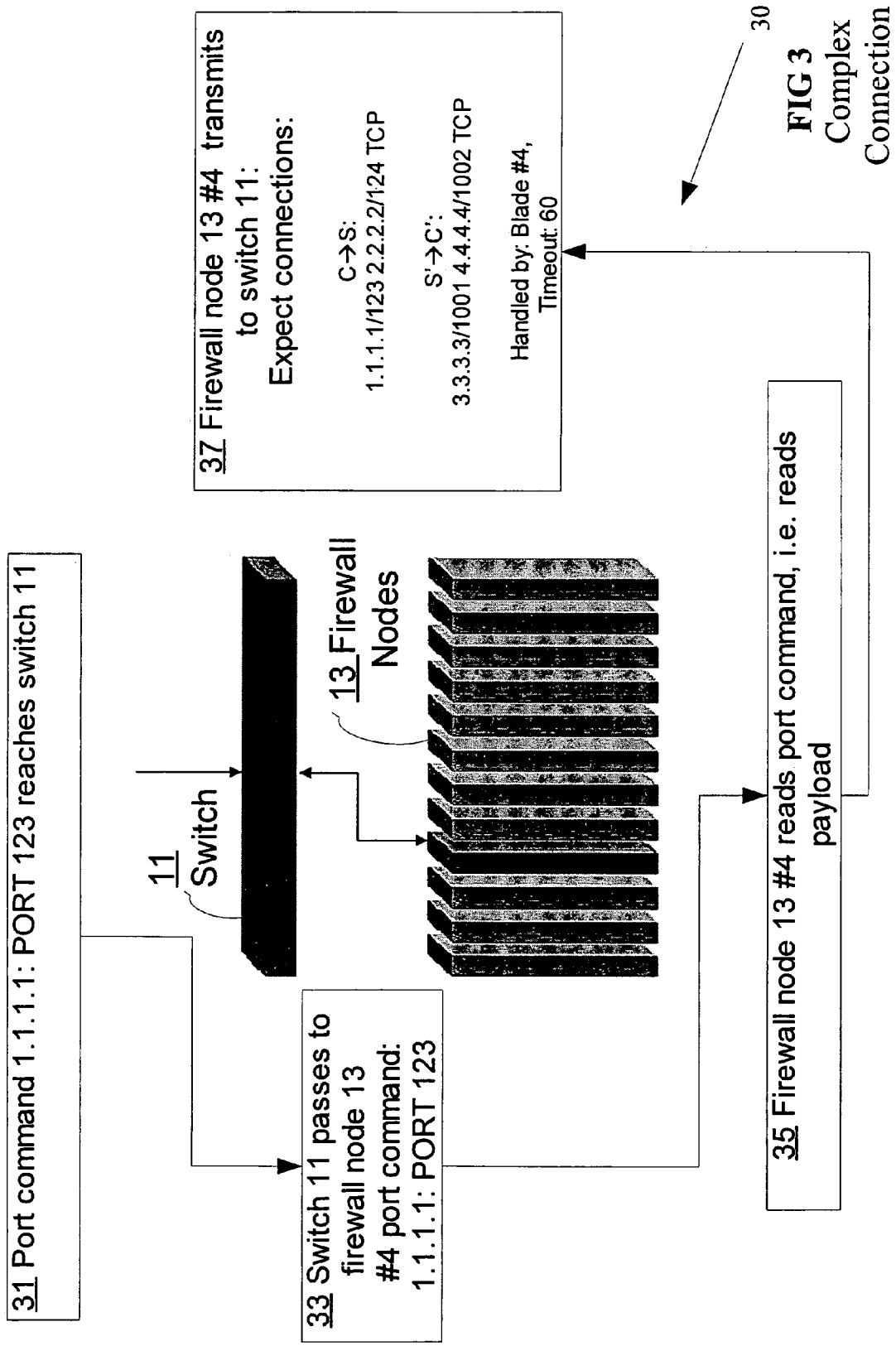
FIG. 3 is a flow drawing of the present invention for processing complex connections.

Reference is now made to FIG. 3, a flow diagram of a processing method for complex connections or sessions, according to an embodiment of the present invention. In the example of FIG. 3, a control connection of a complex connection is established in the same manner as a simple connection. The example of FIG. 3 uses an FTP port command, however the present invention is applicable to any complex connection which include control and data connections in which information regarding the data connection is included in an argument of the control connection. The present invention is further applicable to a session involving multiple control connections which are related to each other. An FTP PORT command reaches (step 31) switch 11. An FTP port command is a control command which includes as an argument of the command a client port to be used in a passive data connection associated with the FTP port command. In the example of FIG. 3, the port command 1.1.1.1 PORT 123 comes from a client of IP address 1.1.1.1 and requests data using client port 123. The port command is passed (step 33) by switch 11 to a firewall node 13, e.g. #4. Firewall node 13 reads (step 35) the port command, included in the payload(s) of the packet(s). Based on the information read in the payload of the packet(s) carrying the PORT command, firewall node 13 transmits (step 37) a control command to switch 11 to expect connections as defined from the arguments of the PORT command. In the example of FIG. 3, network address translation is being used so two connections are expected related to the FTP connection, where C denotes client and S denotes server. The expected connections are typically specified by source IP address/source port and protocol, e.g. TCP. Because of network address translation, the IP address of client C is 1.1.1.1 and the translated IP address C' is different e.g. 4.4.4.4. Similarly, the public IP address of server S is 2.2.2.2 and the translated address S' is 3.3.3.3. Firewall 13 typically transmits along with the control command for the expected connections a firewall node, e.g. #4 to handle the connections as well as a timeout parameter, e.g. 60 which causes the connection to expire 60 seconds after last packet is received, as follows:

C→S:

1.1.1.1/123 2.2.2.2/124 TCP

S'→C':

3.3.3.3/1001 4.4.4.4/1002 TCP

Handled by: Firewall node #4,

Timeout: 60

When an expected data connection is opened, switch 11 already expects the data connection, switch 11 performs the necessary network address translation and forwards the packets to the correct cluster member, e.g firewall node 13 Subsequent packets of the same session are matched to one of the keys of this connection and therefore directed to the same cluster member, firewall node 13 #4. In an alternative embodiment, firewall nodes 13 perform the network address translation (NAT) and in this case commands sent from firewall node 13 to switch 11 do not necessarily include NAT information.

In other embodiments of the present invention, one or more additional switches between firewall cluster 19 and the server may receive commands from firewall nodes 13. Optionally, there may be more than one firewall clusters 19 physically separated and cooperating with each other using multiple switches 11.

In certain protocols, especially voice over IP protocols, a session includes both control and data connections. Firewall node 13 typically opens a data connection and based on data found, e.g. in a payload of a packet of a control connection, firewall node 13 performs a specific action.

According to an embodiment of the present invention, smart load balancing of firewall nodes 13 may be generalized to include other network components 13 such as a cluster of servers 13. Servers 13 that are balanced may also be configured to decide which future simple connections should be directed to each server 13 as part of a complex connection or session. The decision of each server 13 is sent back to a switch 11 connecting servers 13 using a special protocol, even the same protocol as is used for smart load balancing of firewall nodes 13. The decision at the server can be performed in an application running on the server if the application has access to information regarding future connections. An alternative system, according to an embodiment of the present invention includes in server 13 a packet inspecting module which reads contents of the packets, decides which future connections will be sent to the server 13 and communicates the decision to switch 11.

According to other embodiments the present invention supports static and dynamic encryption protocols, e.g. VPN. In the static case, a centralized management installs information about encryption domains in security components 13 and security components 13 communicate information to load-balancer 11 regarding the partition of encrypted connections between security components 13. In the dynamic case, a routing protocol is used between security components 13 (and also with other external routers or VPN gateways) to decide which component 13 will handle which encrypted connections. Once the decision is made, and information regarding the partition of encrypted connections is known, security network components 13 transmit control information regarding the balancing of load to load-balancer 11.

Another option is that the load-balancer 11 allows one security network component 13 to establish a tunnel (e.g. Phase1 and Phase2 of IPSEC VPN) and once a tunnel is established load-balancer 11 receives an instruction from security network component 13 how to identify packets that relate to to that tunnel. Afterwards, all packets from the same VPN tunnel are directed to the same security network component 13. (e.g. using Security Parameters Index, SPI, that appears in the AH header of IPSEC packet.)

Smart Loading Balancing Protocol

Figure 4:
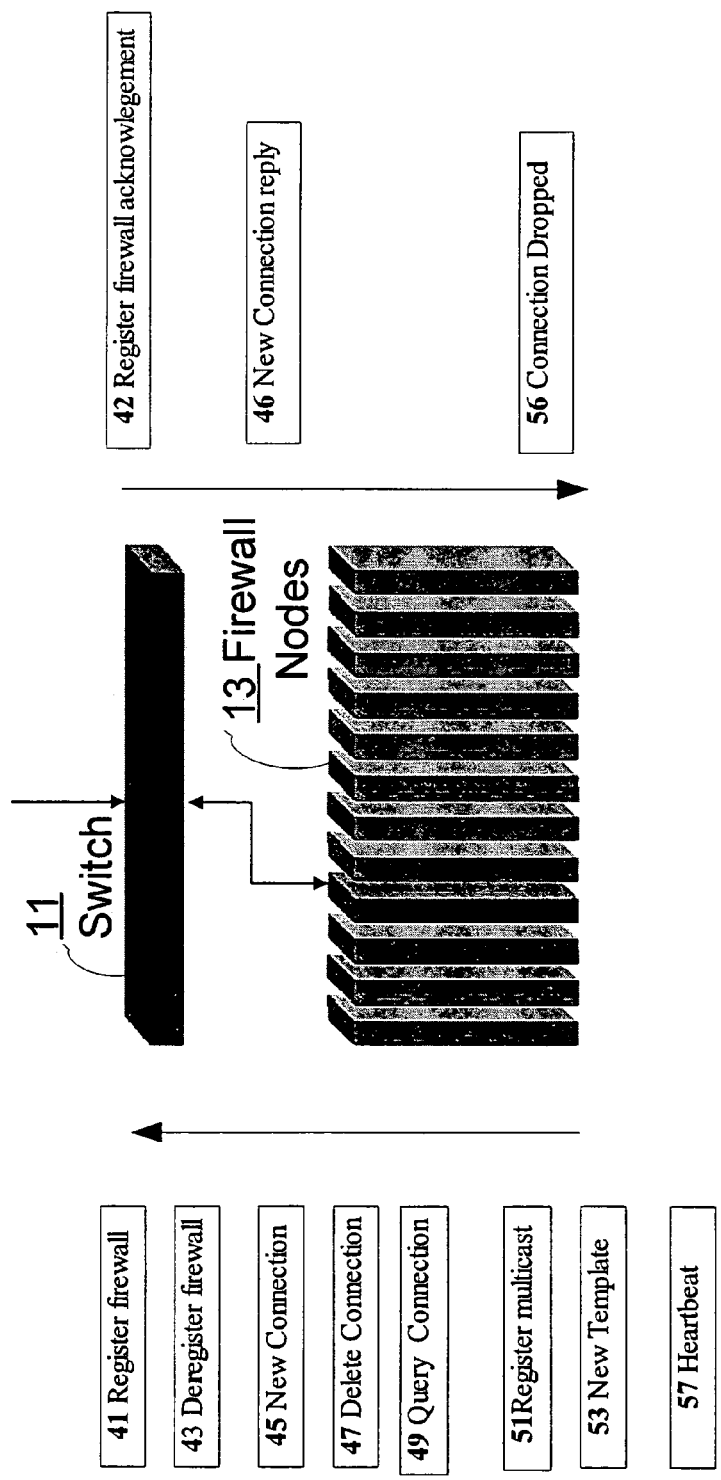
FIG. 4 is a drawing illustrating commands used in an example of a protocol of the present invention.

Reference is now made to FIG. 4 illustrating an example of a smart load balancing protocol which allows firewall nodes 13 to implement the process 30 and to override the default decision made by switch 11. Switch 11 receives commands from the firewalls 13: Typically, all firewalls 13 have the same priority, all commands are asynchronous, some commands may require switch 11 to send a reply, and the protocol is UDP based.

Commands Description

41 Register Firewall:

A register firewall command 41 initializes the connection between a firewall 13 and switch 11. When firewall 13 goes online, switch 11 is notified so load balancing may begin. A parameter of the register firewall command 41 is the firewall identifier. Switch 11 replies with an acknowledgment 42, e.g. ACK. After receiving the register firewall command 41, switch 11 will begin forwarding traffic to firewall 13 according to the current load balancing algorithm.

43 Deregister Firewall:

The deregister firewall command 43 directs the SLB device 10 to ignore a firewall 13. Some of firewall nodes 13 may need to go off-line for maintenance. Additionally, an administrator may choose to use some of the machines for other purposes. A parameter of the deregister firewall command 43 is the firewall identifier. After firewall 13 sends a deregister firewall command to switch 11, existing connections will be forwarded to firewall 13 but new connections will be directed to other firewalls 13. If a firewall 13 stops responding i.e. crashes, switch 13 is expected to forward existing connections from firewall 13 to other firewalls 13.

45 New Connection:

The new connection command 45 instructs switch 11 to direct a connection to a specific firewall 13. In order to maintain stickiness for complex connections, a firewall 13 can send a new connection command to switch 11. Since network address translation (NAT) typically performed by switch 11 may cause both directions to look different, the command contains two expected connections switch 11 should handle. The new connection command typically includes up to four parameters as follows:

1. Client to Server connection: Source IP, Source Port, Destination IP, Destination Port, Protocol
2. Server to Client connection: Source IP, Source Port, Destination IP, Destination Port, Protocol
3. Expiration time in seconds
4. Firewall Identifier Switch 11 may reply with a new connection reply 46 with a connection identifier and a firewall identifier.

After receiving the New-connection command, switch 11 directs packets that belong to this connection to firewall node 13 corresponding to the firewall identifier (parameter 4). start the expiration timer (e.g. each packet resets this timer), and if such a connection is already assigned to a firewall 13, switch 11 notifies the requesting firewall 13 about which firewall 13 is the current handler.

47 Delete Connection:
The Delete-connection command 47 is sent by a firewall when a connection is terminated. A parameter of the Delete-connection command is a connection identifier. Upon receiving such a command, switch 11 should immediately stop forwarding packets of the connection to relevant firewall 13. Packets from this connection, if any, should be treated as a new connection by switch 11.

49 Query Connection
The Query-connection command 49 is sent by firewall 13 to get information about a connection. A parameter is the connection identifier. The switch replies with connection information as follows:
1. Client to Server connection: Source IP, Source Port, Destination IP, Destination Port, Protocol
2. Server to Client connection: Source IP, Source Port, Destination IP, Destination Port, Protocol
3. Expiration time in seconds
4. Firewall Identifier

51 Register Multicast:
The register multicast command directs SLB device 10 to register a multicast connection. The parameters include a firewall identifier, multicast address and a port For some kinds of multicast connections, e.g Dynamic routing daemon, only one firewall 13 can handle the connection A Register-Multicast command should direct a multicast packet to a specific firewall 13.

53 New Template:
In some cases, many connections are opened between the same client and server. In order to save many similar new-connection commands, a New-Template command will be issued.
Each connection that matches the template results in a new connection similar to a connection created by a new-connection command. Parameters of the new template command include:
1. Firewall Identifier
2. Client to Server connection: Source IP, Destination IP, Destination port, Protocol
3. Server to Client connection: Source IP, Source port, Destination IP, Protocol
4. Template Expiration time.
5. Connection Expiration time (reset on each packet).

56 Connection Dropped
A connection dropped command is sent by switch 11 to firewall 13 when a connection is dropped because switch 11 is at maximum capacity and can not handle the connection. A parameter of the Connection-dropped command is the connection identifier. Since switch 11 is the front end for SLB device 10, switch 11 is exposed to denial-of-service attacks. When switch 11 is at maximum capacity, it should drop connections according to some kind of throttling algorithm, such as LRU (least recently used). In such scenarios, switch 11 is expected to notify the specific firewall 13 about the dropped connections.

57 Heartbeat
A Heartbeat command is sent by firewall 13 to switch 11 so that switch 11 can identify cases when firewall 13 is down. A parameter of the Heartbeat command is the firewall identifier.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

While the invention has been described with respect to a limited number of embodiments, it will be appreciated that many variations, modifications and other applications of the invention may be made.

What is claimed is:

1. A method for protecting data communications, the method comprising the steps of:
   (a) providing at least one load-balancer operatively connecting a cluster of security network components, said at least one load-balancer transferring a plurality of data streams respectively to said security components, said at least one load balancer being separate from said security network components;
   (b) transmitting control information from at least one of said security network components to said at least one load-balancer, wherein said control information includes an instruction regarding balancing load of said data streams between said security network components; and
   (c) balancing load, by said at least one load-balancer, based on said control information, only by transferring said plurality of data streams respectively to said security network components.

2. The method according to claim 1, further comprising the step of:
   (d) performing network address translation by said at least one load-balancer, wherein said network address translation is based on said control information.

3. The method according to claim 1, further comprising the step of:
   (d) performing network address translation by said at least one security network component, wherein said control information includes information regarding an expected connection based on said network address translation.

4. The method according to claim 1, further comprising the step of:
   (d) performing encryption by said at least one security network component, wherein said control information includes information regarding an expected connection based on said encryption.

5. The method according to claim 1, wherein the data communications include at least one encrypted session, further comprising the step of:
   (d) identifying an encrypted connection of said at least one encrypted session based on said control information, wherein said balancing load maintains stickiness of said encrypted connection.

6. The method according to claim 1, wherein said control information specifies one of the security network components to receive a new connection.

7. The method, according to claim 1, further comprising the steps of
   (d) receiving at least one packet by said at least one security network component of said cluster through said at least one load-balancer, wherein said packet is of a connection of a communications session; and
   (e) reading by said at least one security network component at least one datum from said packet;
wherein said control information is based on said at least one datum and specifies at least one expected connection.

8. The method according to claim 7, wherein upon said reading, further comprising the steps of:
   (f) encrypting said communications session by said at least one security network component; and
   (g) identifying, by said at least one load-balancer, at least one of said data streams of said encrypted communications session based on said control information.

9. The method according to claim 7, wherein said at least one expected connection includes at least one expected packet of said session.

10. The method according to claim 7, wherein said at least one datum is in a payload of said packet.

11. The method according to claim 7, further comprising the steps of:
(f) upon receiving an expected packet of said at least one expected connection, forwarding said expected packet based on said control information.

12. The method, according to claim 11, wherein said forwarding is from said load balancer to selectively either said security network component or to a network operatively connected to said load balancer thereby bypassing said security network component.

13. The method according to claim 1, wherein said control information specifies an expected client-to-server connection and an expected server-to-client connection, wherein at least one condition is fulfilled selected from the group of:
(i) at least one source parameter of said client-to-server connection differs from at least one destination parameter of said server-to-client connection; and
(ii) at least one destination parameter of said client-to-server connection differs from at least one source parameter of said server-to-client connection.

14. The method according to claim 1, wherein said packet is of a multicast connection and said control information directs said at least one load-balancer to direct all multicast packets of said multicast connection to one of the network components.

15. The method according to claim 1, wherein upon said load-balancer reaching a maximum capacity, further comprising the steps of:
(d) dropping at least one connection of said session; and
(e) informing said network component of said dropping.

16. A system for protecting data communications, the system comprising:
(a) a cluster of security network components; and
(b) at least one load balancer, separate from said security network components, which operatively connects said security network components by transferring a plurality of data streams respectively to said security network components wherein said at least one load balancer receives a command from at least one of said security network components, wherein said command includes an instruction regarding balancing load of said data streams between said security network components, and wherein said balancing load of said data streams in accordance with said instruction is effected only by transferring said data streams respectively to said security network components by said at least one load balancer.

17. The system, according to claim 16, wherein network address translation is performed by a component selected from the group consisting of said security network components and said at least one load-balancer.

18. The system, according to claim 16, wherein said command includes control information based on at least one datum received by said at least one security network component.

19. The system, according to claim 16, wherein said command specifies at least one expected connection.

20. The system, according to claim 19, wherein said at least one expected connection includes at least one expected packet.

21. The system, according to claim 16, wherein at least one of said security network components includes an independent gateway connected through a network interface.

22. The system, according to claim 16, wherein at least one of the security components is a blade connected to said at least one load balancer.

23. The system, according to claim 16, wherein at least two of the security components are implemented at least in part by independent processors on one circuit board.

24. A system for protecting data communications, the data communications including sessions wherein connection information is included as arguments of control commands of the sessions, the system comprising:
(a) a cluster of security network components; and
(b) at least one load balancer, separate from said security network components, which operatively connects said network components to at least one network;
wherein said network components and said at least one load balancer are configured so that
(i) said network components read said connection information; and
(ii) commands from the network components to said at least one load balancer allow maintaining connection stickiness in said sessions, wherein connection stickiness guarantees that all packets of each said sessions are processed by a single network component, and wherein, responsive to said commands, said at least one load balancer maintains said connection stickiness only by transferring packets of the sessions respectively to said security network components.

25. The system, according to claim 24, wherein said commands include a new-connection command, wherein at least one of said network components reads said connection information and based on said connection information, transfers expected connection information to said at least one load balancer.

26. The system, according to claim 24, wherein said commands include a register multicast command wherein all packets of related multicast connections are processed by a single network component.

27. The method of claim 1, wherein each said security network component includes a firewall.

28. The system of claim 16, wherein each said security network component includes a firewall.

29. The system of claim 24, wherein each said security network component includes a firewall.

30. The system of claim 18, wherein said at least one datum is in a payload of a packet received by said at least one security network component.

* * * * *